US008364510B2

(12) United States Patent
Garmon et al.

(10) Patent No.: US 8,364,510 B2
(45) Date of Patent: Jan. 29, 2013

(54) REVENUE OPTIMIZATION FOR CUSTOMERS OR CUSTOMER SUBSETS

(75) Inventors: Ronnie J. Garmon, Marietta, GA (US); Jim J. Deffenbaugh, Atlanta, GA (US)

(73) Assignee: Vuelogic, LLC, Atlanta, GA (US)

( * ) Notice: Subject to any disclaimer, the term of this patent is extended or adjusted under 35 U.S.C. 154(b) by 0 days.

(21) Appl. No.: 13/114,389

(22) Filed: May 24, 2011

(65) Prior Publication Data

US 2012/0303416 A1 Nov. 29, 2012

(51) Int. Cl.
G06Q 40/00 (2006.01)
(52) U.S. Cl. ..................... 705/7.11; 705/7.42
(58) Field of Classification Search ............. 705/7.11, 705/7.42, 7
See application file for complete search history.

(56) References Cited

U.S. PATENT DOCUMENTS

| | | | |
|---|---|---|---|
| 6,553,352 B2 * | 4/2003 | Delurgio et al. ............. | 705/400 |
| 7,072,848 B2 * | 7/2006 | Boyd et al. ................. | 705/14.1 |
| 7,133,848 B2 * | 11/2006 | Phillips et al. .............. | 705/400 |
| 7,251,615 B2 * | 7/2007 | Woo ........................... | 705/7.35 |
| 7,257,561 B1 * | 8/2007 | Abe ............................ | 705/400 |
| 7,287,000 B2 * | 10/2007 | Boyd et al. ................. | 705/14.43 |
| 7,321,865 B2 * | 1/2008 | Kelly et al. ................. | 705/7.35 |
| 7,343,355 B2 * | 3/2008 | Ivanov et al. ............... | 705/400 |
| 7,523,047 B1 * | 4/2009 | Neal et al. .................. | 705/7.35 |
| 7,555,466 B2 | 6/2009 | Eglen et al. | |
| 7,603,286 B2 * | 10/2009 | Ouimet ....................... | 705/7.31 |
| 7,617,119 B1 | 11/2009 | Neal et al. | |
| 7,680,686 B2 * | 3/2010 | Tellefsen et al. ............. | 705/7.31 |
| 7,792,692 B2 | 9/2010 | Caprini et al. | |
| 7,921,030 B1 * | 4/2011 | Verma et al. ................. | 717/107 |
| 8,000,996 B1 * | 8/2011 | Sanli et al. .................. | 705/7.35 |
| 8,140,381 B1 * | 3/2012 | Wu et al. ..................... | 705/7.35 |
| 2003/0187708 A1 * | 10/2003 | Baydar et al. ................ | 705/7 |
| 2003/0229502 A1 * | 12/2003 | Woo ............................ | 705/1 |
| 2004/0024715 A1 * | 2/2004 | Ouimet ........................ | 705/400 |
| 2004/0049470 A1 * | 3/2004 | Ouimet ........................ | 705/400 |
| 2004/0068431 A1 * | 4/2004 | Smith et al. .................. | 705/10 |
| 2008/0208678 A1 * | 8/2008 | Walser et al. ................ | 705/10 |
| 2009/0144101 A1 | 6/2009 | Malov | |
| 2009/0164391 A1 * | 6/2009 | Otto et al. .................... | 705/400 |
| 2010/0145773 A1 | 6/2010 | Desai et al. | |
| 2011/0082720 A1 * | 4/2011 | Swinson et al. ............. | 705/7.35 |

FOREIGN PATENT DOCUMENTS

WO 0210961 2/2002

OTHER PUBLICATIONS

U.S. Appl. No. 12/1567,973, filed Sep. 28, 2009 for "Methods and Systems for Customer Performance Scoring".

* cited by examiner

*Primary Examiner* — Jason Dunham
*Assistant Examiner* — Benjamin S Fields
(74) *Attorney, Agent, or Firm* — Thomas | Horstemeyer, LLP (57) ABSTRACT

Disclosed are various embodiments for determining discounts that optimize revenue for customers or customer subsets. Transaction records that are associated with a customer and a merchant are obtained. Each transaction record identifies a corresponding purchase of a quantity of one of multiple items by the customer from the merchant at a corresponding unit purchase price. A normalized unit purchase price is generated for each transaction record by normalizing the respective unit purchase price relative to a respective unit retail price at the time of purchase. A demand curve is generated for the customer for the items based at least in part on the transaction records and the normalized unit purchase prices. The demand curve identifies a quantity of units that the customer is predicted to purchase at a range of normalized unit purchase prices.

20 Claims, 9 Drawing Sheets

REVENUE OPTIMIZATION FOR CUSTOMERS OR CUSTOMER SUBSETS

STATEMENT REGARDING FEDERALLY SPONSORED RESEARCH OR DEVELOPMENT

This invention was made with Government support under grant No. 0923704 awarded by the National Science Foundation. The Government has certain rights in this invention.

BACKGROUND

The concept of unit elasticity in econometrics relates to changes in willingness of the seller to supply items and in the willingness of the buyer to consume items as price of the items change. Thus, if the price of an item decreases, a buyer may be willing to consume more units of the item. Conversely, if the price of the item increases, the buyer may be willing to consume fewer units of the item. By contrast, a seller of the item may be willing to supply more units of the item when the price increases and fewer units of the item when the price decreases.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 4A-5 are flowcharts illustrating examples of functionality implemented as portions of a revenue optimization service executed in a computing device in the networked environment of FIG. 1 according to various embodiments of the present disclosure.

DETAILED DESCRIPTION

The present disclosure relates to optimizing revenue to merchants for customers or subsets of customers. The purchasing behavior of customers may depend not only on price, but also on whether the price reflects a discount. Some customers may be much more likely to buy an item that is on sale versus an item that is being sold at full retail price. Other customers, by contrast, may be relatively insensitive to discounting. Such purchasing behavior patterns may be observed among customers who are similar in some way. Further, a purchasing behavior pattern may be consistent for a customer over a wide range of items from the merchant, regardless of absolute price. For example, a customer who is likely to buy a compact disc at 50% off retail may also be likely to buy a high-end stereo at 50% off retail, even though the discounted prices may differ by orders of magnitude.

Various embodiments of the present disclosure may be employed to determine pricing and/or discounting to be offered to a customer or subset of customers in order to optimize revenue for a merchant. To this end, the econometric concept of a unit elasticity point may be applied at the level of individual merchants and customers. In various embodiments, a supply curve for the merchant and a demand curve for the customer(s) are generated, and the point of intersection corresponds to the unit elasticity point. The unit elasticity point is the point that optimizes revenue based on the willingness of a merchant to sell at that price and the willingness of a customer to buy at that price. The supply and demand curves may be computed for a portfolio of products using a normalized unit pricing structure whereby sales prices are normalized relative to the full retail prices of the items. In the following discussion, a general description of the system and its components is provided, followed by a discussion of the operation of the same.

Figure 1:
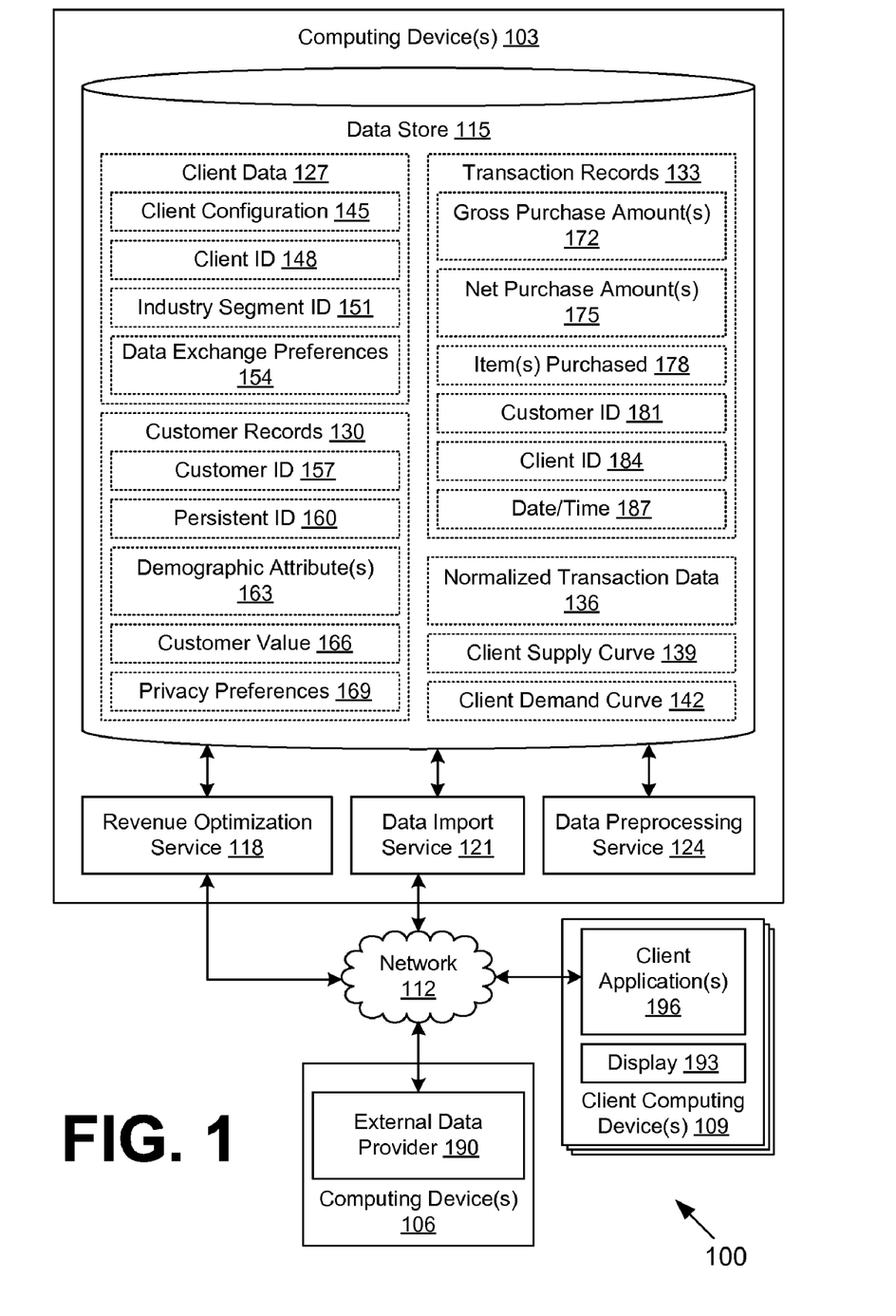
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more computing devices 106 and one or more client computing devices 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include a revenue optimization service 118, a data import service 121, a data preprocessing service 124, and other applications, services, processes, systems, engines, or functionality not discussed in detail herein. The revenue optimization service 118 is executed to process various data to generate data models. The data models are employed by the revenue optimization service 118 to predict optimal pricing for items with the goal of maximizing revenue to the merchant. As used herein, the term "item" may refer to products, goods, services, software downloads, and/or any other item that may be purchased, rented, licensed, etc. for a price.

The data import service 121 is executed to import various externally provided data from the computing devices 106 for use by the revenue optimization service 118 and/or the data preprocessing service 124. The data preprocessing service 124 is an optional service that may be executed to preprocess data for use by the revenue optimization service 118. To this end, the data preprocessing service 124 may preprocess data to generate data models, normalized prices, etc. that may be used by the revenue optimization service 118 to predict the optimal pricing. Such preprocessing by the data preprocessing service 124 may occur, for example, during nights, weekends, or other times in advance of obtaining price optimization requests from clients.

The data stored in the data store 115 includes, for example, client data 127, customer records 130, transaction records 133, normalized transaction data 136, one or more client supply curves 139, one or more client demand curves 142, and potentially other data. The client data 127 includes various data relating to a client, such as a merchant, retailer, restaurant, vendor, etc. The client data 127 may include, for example, a client configuration 145, a client identifier 148, an industry segment identifier 151, data exchange preferences 154, and/or other data. The client configuration 145 may include various parameters that control functionality and options for the client. The client identifier 148 corresponds to a unique identifier for the client.

The industry segment identifier 151 identifies an industry segment that is associated with the client. The industry segment identifier 151 may correspond to a standardized code for classifying business establishments under a system such as, e.g., the North American Industry Classification System (NAICS), the Standard Industrial Classification (SIC) system, or another system. The data exchange preferences 154 determine whether data derived from transaction records 133 of the client may be shared with other clients. Such exchanges may, for example, be limited to related clients (e.g., subsidiaries, etc.), clients within an industry, clients having the same customers, and so on. The data exchange preferences 154 may also determine whether data derived from other clients may be used in computing data models for optimizing revenue. Such retrieved data may be industry aggregate, customer aggregate within a family of clients, customer aggregate within an industry segment, customer aggregate with no limitations, and so on.

The customer records 130 include information that is related to customers of the client, other than the transaction records 133. The customer records 130 may include a customer identifier 157, a persistent identifier 160, one or more demographic attributes 163, a customer value 166, privacy preferences 169, and/or other data. The customer identifier 157 uniquely identifies the customer among other customers of the client. The persistent identifier 160, if present, uniquely identifies the customer among customers of multiple clients in the system. For example, a customer may have different customer identifiers 157 for two different merchants but the same persistent identifier 160 for both merchants.

The demographic attributes 163 include various attributes that may be associated with the customer, such as address, geographic area, zip code, neighborhood classification, age, gender, family status, income, and so on. The customer value 166 may represent a value of the customer to the client. For example, a long-time customer of the client who makes many purchases may have a relatively higher customer value 166 than a new customer who has made one purchase. The privacy preferences 169 of the customer may indicate, for example, who can contact the customer, who can use the data associated with the customer, and so on. In the privacy preferences 169, a customer may allow no data use and/or contact, data use and/or contact by the client only, data use and/or contact by clients within the same client family, data use and/or contact by any clients of the system, and/or other settings.

The transaction records 133 correspond to records of purchases, rentals, licenses, and/or other transactions between a customer and a client. Although the term "purchase" is used herein, it is understood to encompass similar types of transactions, which could include rentals, licenses, etc. Each transaction record 133 may include, for example, a gross purchase amount 172, a net purchase amount 175, one or more items purchased 178, a customer identifier 181, a client identifier 184, a date/time 187 of the transaction, and/or other data. The gross purchase amount 172 represents a purchase amount (e.g., full retail price) before any discount amount has been subtracted. The net purchase amount 175 represents the purchase price actually paid by the customer after all applicable discounts.

The items purchased 178 identifies the item(s) purchased by the customer through the transaction. The item(s) may be identified by a stock keeping unit (SKU) or other identifier. In some embodiments, each purchase of a quantity of a different item within a transaction may be reflected in a respective transaction record 133. The customer identifier 181 may include a customer identifier 157 of the customer in the transaction for the client. The customer identifier 181 may also include a persistent identifier 160 associated with the customer. The client identifier 184 corresponds to a client identifier 148 of the client in the transaction. The date/time 187 corresponds to the time when the transaction occurred or was processed.

The normalized transaction data 136 refers to data generated from the transaction records 133 that normalizes the net purchase amount 175 of the transaction record 133 relative to the gross purchase amount 172. In one embodiment, the normalized unit purchase price in the normalized transaction data 136 corresponds to a standardized percent of retail. As a non-limiting example, where there is no discount and the net purchase amount 175 equals the gross purchase amount 172, the normalized unit purchase price may be 1.00. As another non-limiting example, where there is a 25% discount, the gross purchase amount 172 is $100, and the net purchase amount 175 is $75, the normalized unit purchase price may be 0.75.

The client supply curve 139 corresponds to a quantity of items that a client is willing to supply at a range of normalized unit purchase prices. In one embodiment, the client supply curve 139 may be determined from the following equation:

$$E_{x,y} = \left(\frac{x_2 - x_1}{(x_1 + x_2)/2}\right) / \left(\frac{y_2 - y_1}{(y_1 + y_2)/2}\right),$$

where x refers to a normalized unit purchase price, y refers to a quantity at the normalized unit purchase price, and the first observed $x_1$ is 1.00 (or 100%). The client demand curve 142 corresponds to a demand curve for all customers of a client, which provides a quantity of items that the customers of the client are willing to purchase at a range of normalized unit purchase prices. In one embodiment, the client demand curve 142 may be determined from the following equation:

$$E_{x,y} = \left(\frac{x_2 - x_1}{(x_1 + x_2)/2}\right) / \left(\frac{y_2 - y_1}{(y_1 + y_2)/2}\right),$$

where x refers to a normalized unit purchase price, y refers to a quantity at the normalized unit purchase price, and the first observed $x_1$ is the lowest observed normalized unit purchase price with a non-negative quantity.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store that is accessible to the computing device 106. The components executed on the computing device 106, for example, include an external data provider 190 and other applications, services, processes, systems, engines, or functionality not discussed in detail herein. The external data provider 190 is executed to supply data to the data import service 121 that may be used in generating the client data 127, the customer records 130, the transaction records 133, and/or other data. In various embodiments, the external data provider 190 may be controlled by the client or an entity other than the entity controlling the computing device 103.

The client computing device 109 is representative of a plurality of client devices that may be coupled to the network 112. The client computing device 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 109 may include a display 193. The display 193 may comprise, for example, one or more devices such as cathode ray tubes (CRTs), liquid crystal display (LCD) screens, gas plasma-based flat panel displays, LCD projectors, or other types of display devices, etc.

The client computing device 109 may be configured to execute various applications such as a client application 196 and/or other applications. The client application 196 is executed to issue commands and/or configure the operation of the revenue optimization service 118. Additionally, the client application 196 may be configured to render a visual display on the display 193 to visualize the results provided by the revenue optimization service. To this end, the client application 196 may comprise a user interface. In one embodiment, the client application 196 includes a browser that is executed to access and render network pages, such as web pages, or other network content served up by the computing device 103 and/or other servers. The client computing device 109 may be configured to execute applications beyond the client application 196 such as, for example, browser applications, email applications, instant message applications, and/or other applications. It is understood that in other embodiments of the networked environment 100, the client computing device 109 may also include the functionality shown in computing device 103.

Figure 2:
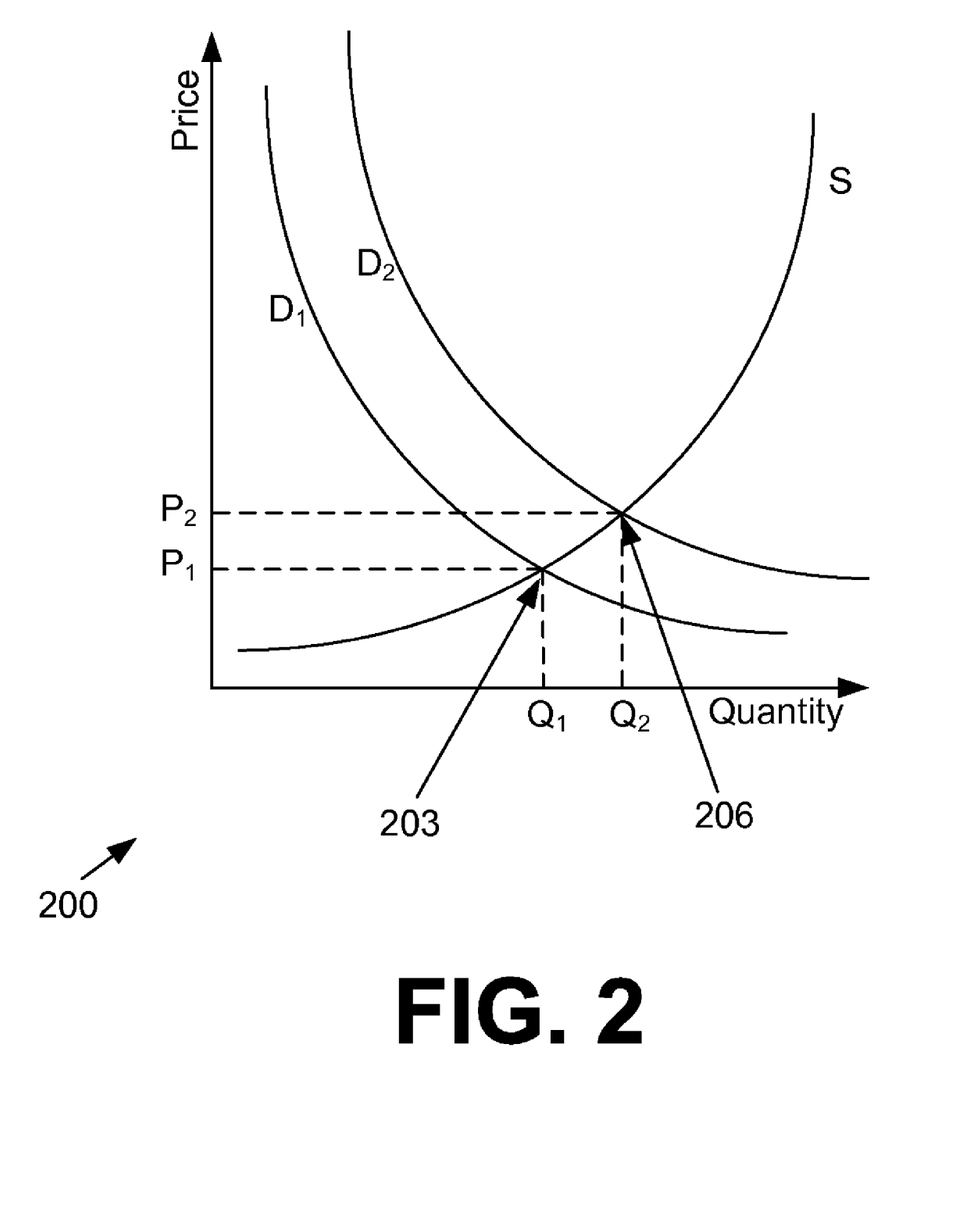
FIG. 2 is a diagram illustrating the intersections of a supply curve with demand curves as employed by a revenue optimization service executed in a computing device in the networked environment of FIG. 1 according to various embodiments of the present disclosure.

Referring next to FIG. 2, shown is a diagram 200 illustrating the intersections of a supply curve S with demand curves $D_1$ and $D_2$ as employed by a revenue optimization service 118 (FIG. 1) executed in a computing device 103 (FIG. 1) in the networked environment 100 (FIG. 1) according to various embodiments. The diagram 200 is shown with quantity on the x-axis and price on the y-axis, as is the convention with such graphs in the field of economics. The supply curve S corresponds to the client supply curve 139 (FIG. 1), which shows a quantity of items that a client is willing to supply at a range of normalized unit purchase prices. The demand curves $D_1$ and $D_2$ correspond to client demand curves 142 (FIG. 1) for any of the customers of the client, where the demand curve $D_1$ precedes demand curve $D_2$ in time.

The revenue optimization service 118 is configured to establish the consumption of the customer by examining the actual price and quantity at which items are purchased. The purchases may be within the domain of the client or, if sufficient data is unavailable, within the domain of other clients in the same industry segment. The demand curves $D_1$ and $D_2$ may be different for different customers. The optimum price points 203 and 206 correspond to a discount factor or percentage ($P_1$ or $P_2$) at a given quantity ($Q_1$ or $Q_2$) that generates the greatest amount of net revenue. The optimum price points 203 and 206 are at the intersection of the supply curve S with the respective demand curves $D_1$ and $D_2$.

Referring back to FIG. 1, a general description of the operation of the various components of the networked environment 100 is provided. To begin, a merchant (referred to herein as a "client") transfers transaction records 133 to the computing device 103 via the data import service 121 or by upload through the client application 196 over the network 112. Additional data may be imported by the data import service 121 from one or more external data providers 190 over the network 112. The data import service 121 and/or the data preprocessing service 124 may establish the record structure within the data store 115 and/or generate other data in the data store 115.

The client initiates a profile optimization request to determine an optimized discount for an item or group of items. The profile optimization request is sent from the client application 196 to the revenue optimization service 118. A set of transaction records 133 is determined for a customer or subset of customers for transactions occurring within an observed time period. The transaction records 133 may relate to one item or all items in a portfolio of items offered for sale by the client.

In various embodiments, the revenue optimization service 118 may determine whether the set of transaction records 133 is statistically sufficient. If not sufficient, the set of transaction records 133 may be augmented to include other transaction records 133 from other merchants within the same industry segment as the client. Sufficiency may be determined based, for example, on whether the quantity of transaction records 133 meets a minimum threshold, whether the quantity of unique items described by the transaction records 133 meets a minimum threshold, and/or on other criteria. The set of transaction records 133 may also be augmented to include other transaction records 133 associated with other customers of the client that have similar characteristics to the customer or subset of customers.

The revenue optimization service 118 generates or obtains a normalized unit purchase price for each of the transaction records 133 by normalizing the respective unit purchase price (i.e., the net purchase amounts 175) relative to a respective unit retail price at a time of purchase (i.e., the gross purchase amounts 172). In one embodiment, the normalized unit purchase price corresponds to a standardized percentage of the retail price. The normalized unit purchase prices may be stored in the normalized transaction data 136.

The revenue optimization service 118 (or the data preprocessing service 124) generates a client supply curve 139 for the client for the items in the transaction records 133. The client supply curve 139 identifies a quantity of units that the client is willing to sell at a range of normalized unit purchase prices. The revenue optimization service 118 then generates a demand curve for the customer or subset of customers based at least in part on the transaction records 133 and the normalized unit purchase prices. The demand curve identifies a quantity of units that the customer or subset of customers is predicted to purchase at a range of normalized unit purchase prices.

The revenue optimization service 118 determines a unit elasticity point from a point of intersection of the client supply curve 139 and the generated demand curve. The revenue optimization service 118 may recommend a discount for one or more of the items to the client based at least in part on the client supply curve 139 and the generated demand curve. Various other information may be presented to the client through user interfaces of the client application 196.

Figure 3:
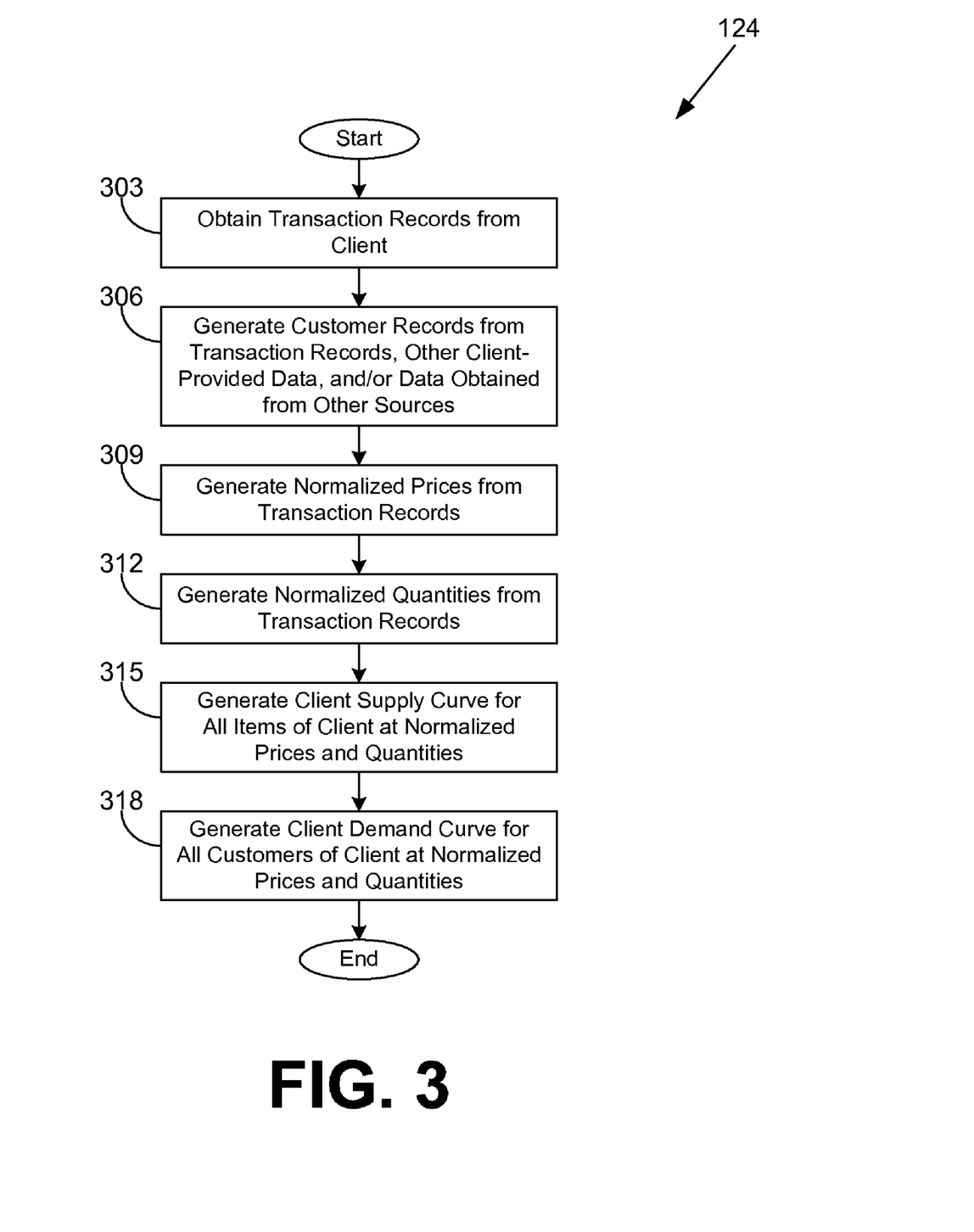
FIG. 3 is a flowchart illustrating one example of functionality implemented as portions of a data preprocessing service executed in a computing device in the networked environment of FIG. 1 according to various embodiments of the present disclosure.

Turning now to FIG. 3, shown is a flowchart that provides one example of the operation of a portion of the data preprocessing service 124 according to various embodiments. It is understood that the flowchart of FIG. 3 provides merely an example of the many different types of functional arrangements that may be employed to implement the operation of the portion of the data preprocessing service 124 as described herein. As an alternative, the flowchart of FIG. 3 may be viewed as depicting an example of steps of a method implemented in the computing device 103 (FIG. 1) according to one or more embodiments. It is noted that any of the tasks performed by the data preprocessing service 124 may be performed instead by the revenue optimization service 118 (FIG. 1) in other embodiments.

Beginning with box 303, the data preprocessing service 124 obtains a set of transaction records 133 (FIG. 1) from a client. In one embodiment, the transaction records 133 may be imported from one or more external data providers 190 (FIG. 1). In another embodiment, the transaction records 133 may be supplied by the client through an interface of the client application 196 (FIG. 1). In box 306, the data preprocessing service 124 generates one or more customer records 130 (FIG. 1) from the transaction records 133, other client-provided data, and/or other data obtained from external data providers 190.

In box 309, the data preprocessing service 124 generates normalized unit purchase prices from the transaction records 133. The net purchase amounts 175 (FIG. 1) of the transaction records 133 are normalized relative to the gross purchase amounts 172 (FIG. 1). In one embodiment, the data preprocessing service 124 computes the normalized unit purchase prices as a standard percentage of the retail price at the time of the purchase. The normalized unit purchase prices are stored as normalized transaction data 136 (FIG. 1). In box 312, the data preprocessing service 124 generates normalized quantities of the items purchased 178 (FIG. 1) for the normalized transaction data 136. The normalized quantities correspond to a total quantity of all of, or a subset of, the items purchased 178 at a normalized unit purchase price.

In box 315, the data preprocessing service 124 generates a client supply curve 139 (FIG. 1) for the client. In box 318, the data preprocessing service 124 generates a client demand curve 142 (FIG. 1) for the client. Thereafter, the portion of the data preprocessing service 124 ends. It may be preferable to perform the tasks of boxes 315 and 318 at night or another time of low system usage for later use. However, it is noted that the tasks of boxes 315 and 318 may instead be performed by the revenue optimization service 118 on demand at the time of a client request according to the technical requirements.

Figure 4A:
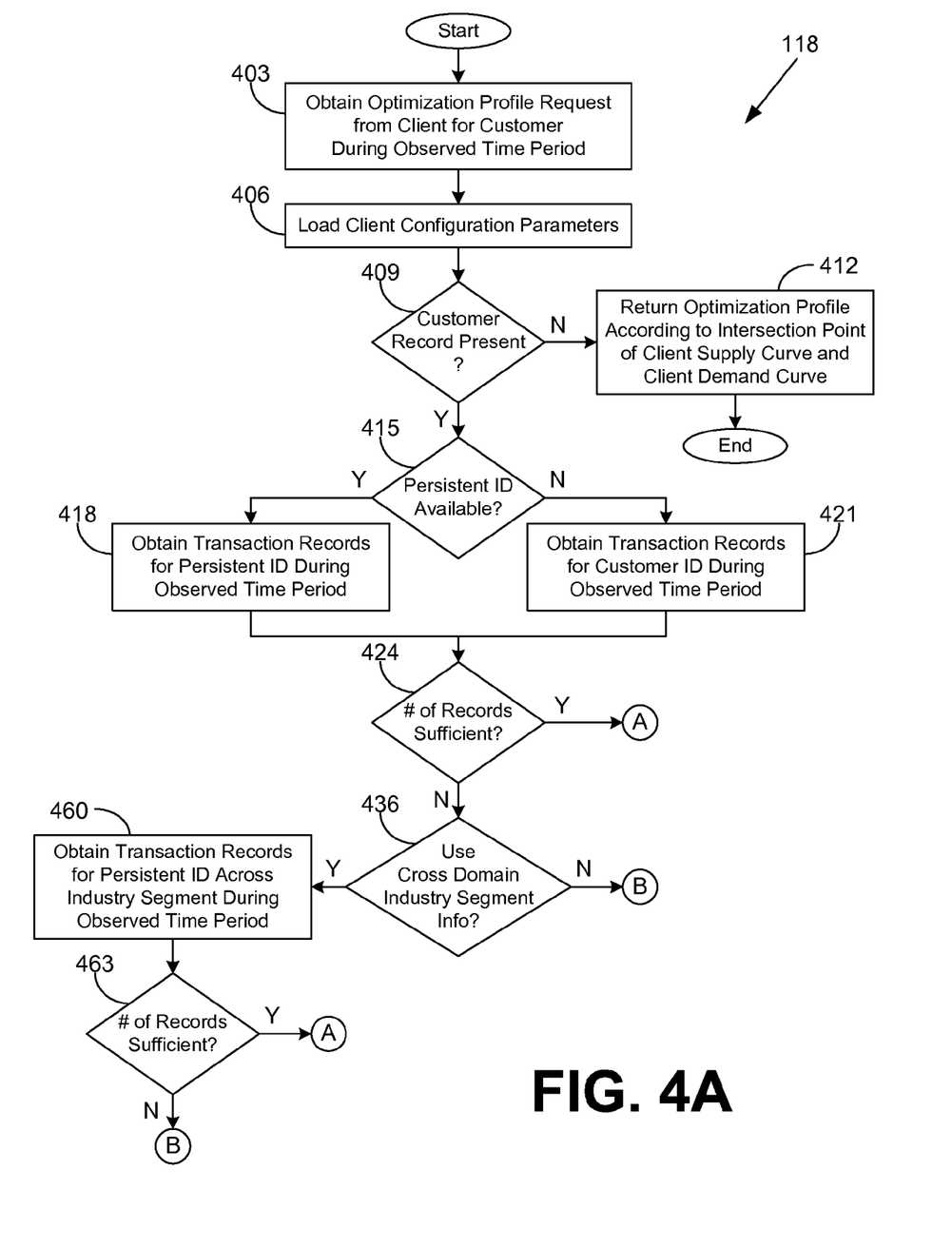
Figure 4B:
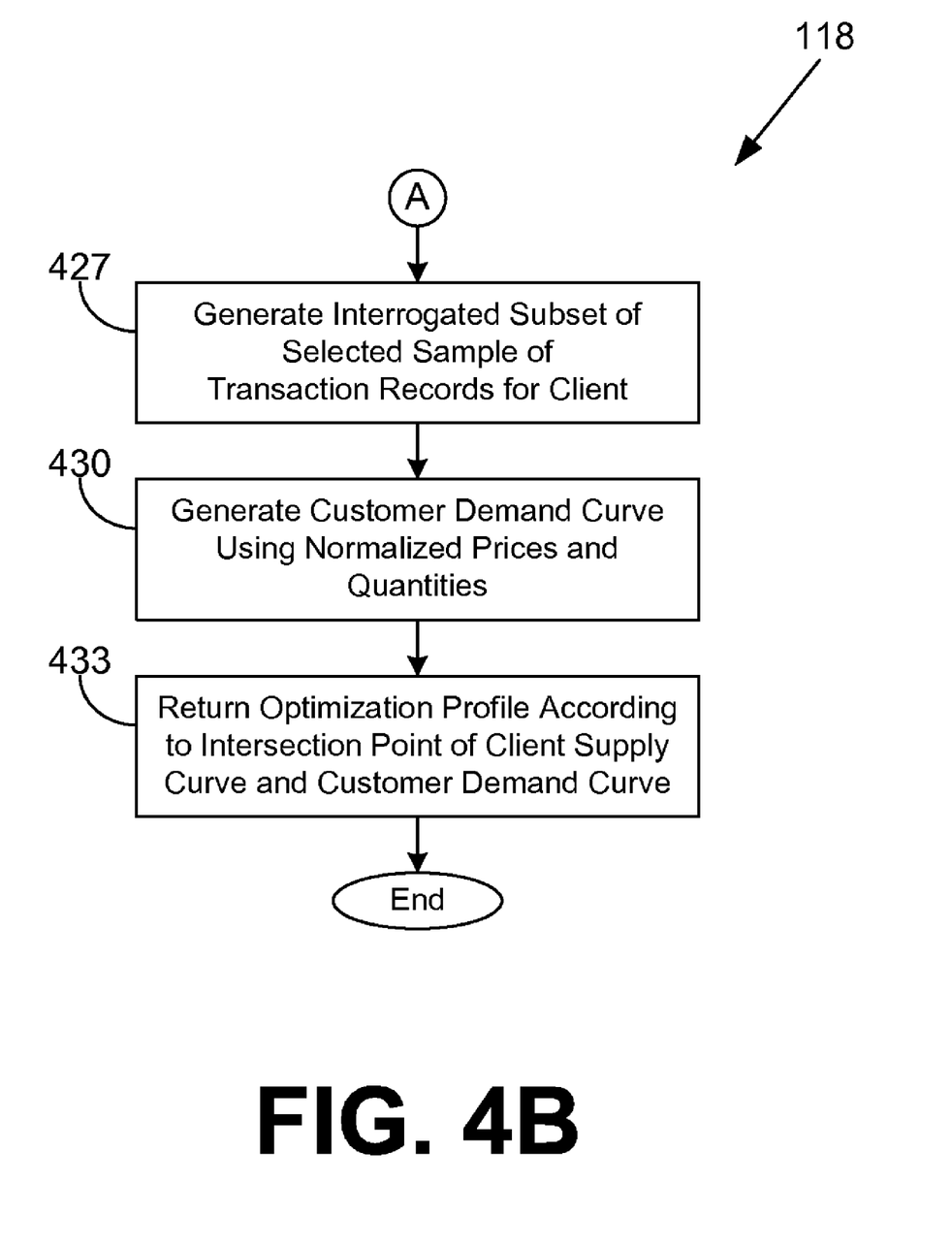
Figure 4C:
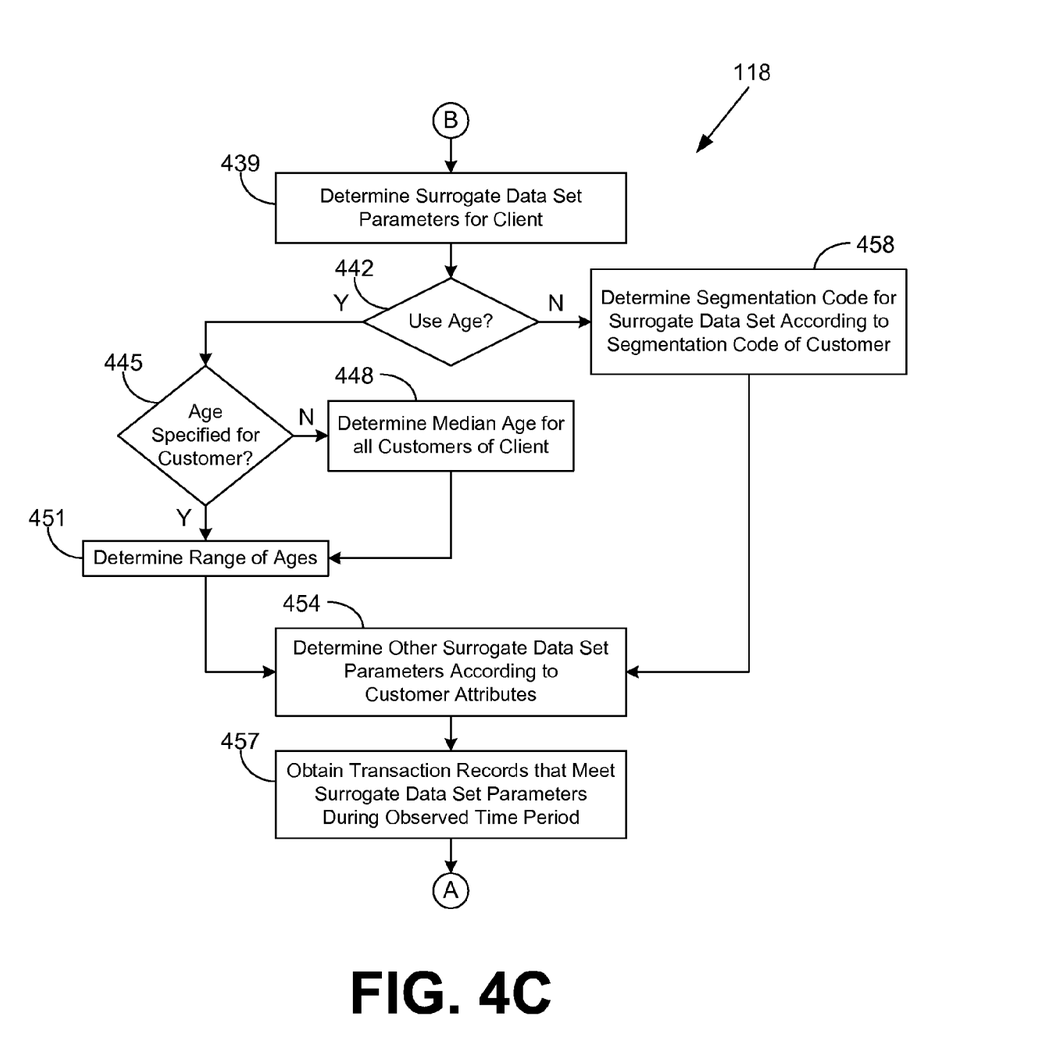

With reference to FIGS. 4A-4C, shown is a flowchart that provides one example of the operation of a portion of the revenue optimization service 118 according to various embodiments. It is understood that the flowchart of FIGS. 4A-4C provides merely an example of the many different types of functional arrangements that may be employed to implement the operation of the portion of the revenue optimization service 118 as described herein. As an alternative, the flowchart of FIGS. 4A-4C may be viewed as depicting an example of steps of a method implemented in the computing device 103 (FIG. 1) according to one or more embodiments.

Beginning with box 403 in FIG. 4A, the revenue optimization service 118 obtains an optimization profile request from a client for a customer during a default or specified observed time period. As a non-limiting example, the observed time period may be 365 days. The request may be obtained from the client application 196 (FIG. 1) via an application programming interface (API) with various data attributes such as a client identifier 148 (FIG. 1), a customer identifier 157 (FIG. 1), requested information, a transaction amount, a date or other time period, and/or other attributes. The requested information may, for example, relate to an optimal price point and discount amount, a community of the customer, a market basket of items, a customer profile, a customer score or value, or a trigger point. Various techniques related to customer scoring are described in U.S. patent application entitled "Methods and Systems for Customer Performance Scoring" filed on Sep. 28, 2009 and assigned application Ser. No. 12/567,973, which is incorporated by reference in its entirety.

In box 406, the revenue optimization service 118 may load various information from the client configuration 145 (FIG. 1). This information may include parameters to govern augmenting transaction records 133 (FIG. 1), an observed time period parameter, and/or other parameters. The revenue optimization service 118 may also load the data exchange preferences 154 (FIG. 1) and the industry segment identifier 151 (FIG. 1) of the client.

In box 409, the revenue optimization service 118 determines whether a customer record 130 (FIG. 1) is present for the customer. If no customer record 130 is present, the revenue optimization service 118 continues to box 412. In box 412, the revenue optimization service 118 returns an optimization profile according to an intersection point of the client supply curve 139 (FIG. 1) and the client demand curve 142 (FIG. 1). In other words, because data was not available for the specific customer, aggregate data from multiple other customers may be used as a proxy. Thereafter, the portion of the revenue optimization service 118 ends.

If a customer record 130 is present, the revenue optimization service 118 continues to box 415 and determines whether a persistent identifier 160 (FIG. 1) is available for the customer record 130 and can be used per the privacy preferences 169 (FIG. 1) of the customer. If a persistent identifier 160 is available for the customer and can be used, the revenue optimization service 118 next obtains transaction records 133 matching the persistent identifier 160 for the customer in box 418 according to the data exchange preferences 154 of the client and the privacy preferences 169 of the customer. If a persistent identifier 160 is not available or cannot be used, the revenue optimization service 118 instead moves to box 421 and obtains transaction records 133 matching the customer identifier 157 during the observed time period according to the privacy preferences 169 of the customer. In either case, the revenue optimization service 118 proceeds to box 424.

In box 424, the revenue optimization service 118 determines whether the number of returned transaction records 133 is statistically sufficient. In other words, the revenue optimization service 118 may determine whether the quantity or number of the transaction records 133 meets a minimum threshold. Also, or instead, the revenue optimization service 118 may determine whether the number of different items in the retrieved sample of transaction records 133 (e.g., the unique number of SKUs or other item identifiers) meets a minimum threshold. If the number of returned transaction records 133 is statistically sufficient, the revenue optimization service 118 proceeds to box 427 of FIG. 4B.

In box 427, the revenue optimization service 118 may generate an interrogated subset of the selected sample of the transaction records 133 for the client. The interrogated subset may be determined according to various criteria. In box 430, the revenue optimization service 118 generates a customer demand curve using normalized unit purchase prices and normalized quantities from the transaction records 133 in the interrogated subset. The revenue optimization service 118 generates the normalized transaction data 136 (FIG. 1) for the interrogated subset of the transaction records 133 if not already generated by the data preprocessing service 124 (FIG. 1). The revenue optimization service 118 creates the customer demand curve according to the equation:

$$E_{x,y} = \left(\frac{x_2 - x_1}{(x_1 + x_2)/2}\right) / \left(\frac{y_2 - y_1}{(y_1 + y_2)/2}\right),$$

where x refers to a normalized unit purchase price, y refers to a quantity at the normalized unit purchase price, and the first observed $x_1$ is the lowest observed normalized unit purchase price with a non-negative quantity.

In box 433, the revenue optimization service 118 returns an optimization profile for the customer according to the intersection point of the client supply curve 139 (FIG. 1) and the customer demand curve. The optimization profile may include, for example, the client identifier 148, the customer identifier 157, the gender of the customer, the date of birth of the customer, the customer value 166 (FIG. 1) or score, an optimal discount percentage, a date, an information requested code, a status code, and/or other information. The record returned may be stored for logging and/or billing purposes. Thereafter, the portion of the revenue optimization service 118 ends.

If the revenue optimization service 118 instead determines in box 424 of FIG. 4A that the number of retrieved transaction records 133 is not statistically sufficient, the revenue optimization service 118 continues to box 436. In box 436, the revenue optimization service 118 determines whether cross domain industry segment information is to be used to augment the data set based at least in part on the data exchange preferences 154 and the privacy preferences 169. If the revenue optimization service 118 determines that cross domain industry segment information is not to be used, the revenue optimization service 118 moves to box 439 of FIG. 4C.

In box 439, the revenue optimization service 118 determines surrogate data set parameters for the client in the client configuration 145. In box 442, the revenue optimization service 118 determines whether age is to be used for a surrogate data set. If age is to be used, the revenue optimization service 118 transitions to box 445 and determines whether an age is specified for the customer in the demographic attributes 163 (FIG. 1). If the age is not specified, the revenue optimization service 118 determines a median age for all customers of the client in box 448. The revenue optimization service 118 continues to box 451. If an age is specified, the revenue optimization service 118 also continues to box 451.

In box 451, the revenue optimization service 118 determines a range of ages according to the surrogate data set parameters, the age of the customer, the median age, and/or other parameters. As a non-limiting example, the range of ages may be a five-year range. The range of ages is employed as a surrogate data set parameter. In box 454, the revenue optimization service 118 determines other surrogate data set parameters according to customer demographic attributes 163 such as, for example, segmentation code, geography, gender, and so on. As a non-limiting example, the geography may comprise a zip code, a city, a state, a country, and/or other geographic area. In box 457, the revenue optimization service 118 obtains transaction records 133 that meet the surrogate data set parameters during the observed time period. The revenue optimization service 118 then continues to box 427 of FIG. 4B as described above.

If revenue optimization service 118 instead determines in box 442 that age is not to be used for the surrogate data set, the revenue optimization service 118 moves to box 458 and determines a segmentation code for the surrogate data set according to a segmentation code associated with the customer. Next, in box 454, the revenue optimization service 118 determines other surrogate data set parameters according to customer demographic attributes 163 such as, for example, geography, gender, and so on. In box 457, the revenue optimization service 118 obtains transaction records 133 that meet the surrogate data set parameters during the observed time period. The revenue optimization service 118 then continues to box 427 of FIG. 4B as described above.

If the revenue optimization service 118 instead determines in box 436 of FIG. 4A that cross domain industry segment information is to be used, the revenue optimization service 118 proceeds to box 460. In box 460, the revenue optimization service 118 obtains transaction records 133 matching the persistent identifier 160 of the customer in the customer identifier 181 (FIG. 1) across the industry segment identified by the industry segment identifier 151 of the client during the observed time period. The cross domain industry segment information may be limited to related clients or be open to unrelated clients depending on data exchange preferences 154 and/or privacy preferences 169.

In box 463, the revenue optimization service 118 determines whether the number of transaction records 133 obtained is statistically sufficient. In other words, the revenue optimization service 118 may determine whether the quantity or number of the transaction records 133 meets a minimum threshold. Also, or instead, the revenue optimization service 118 may determine whether the number of different items in the retrieved sample of transaction records 133 (e.g., the unique number of SKUs or other item identifiers) meets a minimum threshold. If the number of returned transaction records 133 is statistically sufficient, the revenue optimization service 118 proceeds to box 427 of FIG. 4B. Otherwise, the revenue optimization service 118 proceeds to box 439 of FIG. 4C.

Figure 5:
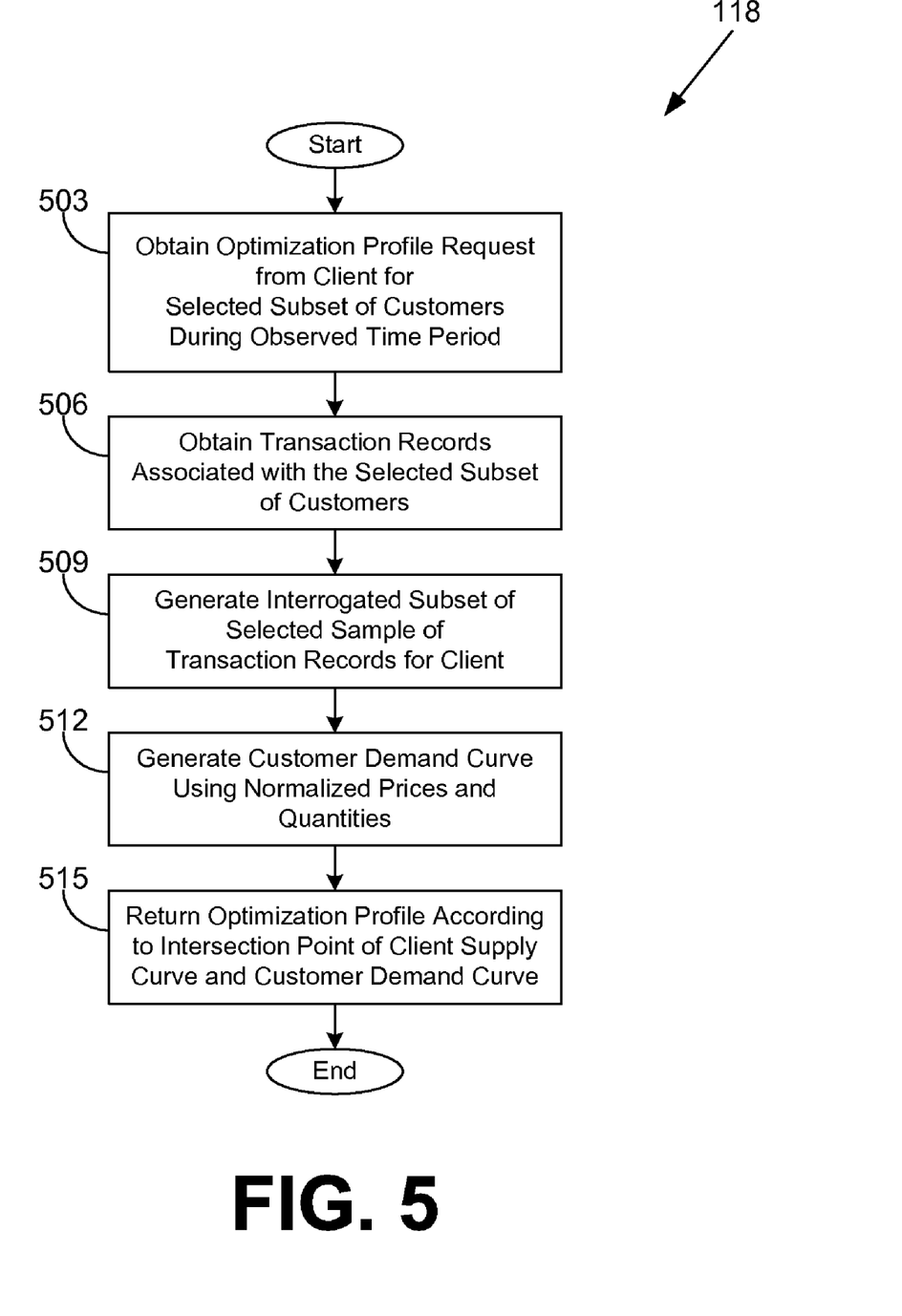

Referring next to FIG. 5, shown is a flowchart that provides one example of the operation of another portion of the revenue optimization service 118 according to various embodiments. It is understood that the flowchart of FIG. 5 provides merely an example of the many different types of functional arrangements that may be employed to implement the operation of the portion of the revenue optimization service 118 as described herein. As an alternative, the flowchart of FIG. 5 may be viewed as depicting an example of steps of a method implemented in the computing device 103 (FIG. 1) according to one or more embodiments.

Beginning with box 503, the revenue optimization service 118 obtains an optimization profile request from a client for a selected subset of customers during an observed time period. Using the client application 196 (FIG. 1), the client may select a subset of its customer population using a selection tool. The selection tool may select on various attributes, including but not limited to, microanalytics with customer demographics, geodemographics, customer value 166 (FIG. 1) and other scoring attributes, combinations of items purchased, performance, and/or other attributes. As a non-limiting example of microanalytics-based selection, a client may request records for all customers who are female, between the ages of 18 and 25, live in Georgia, and have spent $200 with the client in the last three months. As a non-limiting example of geodemographics-based selection, a client may specify a segmentation code according to Mosaic, Prizm, MicroVision, or another commercially available system.

In box 506, the revenue optimization service 118 obtains the transaction records 133 (FIG. 1) associated with the subset of the customers. The customers of the client may be identified by their customer identifier 157. In box 509, the revenue optimization service 118 generates an interrogated subset of the selected sample of transaction records 133 for the client. In box 512, the revenue optimization service 118 generates a customer demand curve for the subset of the customers using normalized unit purchase prices and normalized quantities from the transaction records 133 in the interrogated subset. The revenue optimization service 118 generates the normalized transaction data 136 (FIG. 1) for the interrogated subset of the transaction records 133 if not already generated by the data preprocessing service 124 (FIG. 1). The revenue optimization service 118 creates the customer demand curve according to the equation:

$$E_{x,y} = \left(\frac{x_2 - x_1}{(x_1 + x_2)/2}\right) / \left(\frac{y_2 - y_1}{(y_1 + y_2)/2}\right),$$

where x refers to a normalized unit purchase price, y refers to a quantity at the normalized unit purchase price, and the first observed $x_1$ is the lowest observed normalized unit purchase price with a non-negative quantity.

In box 515, the revenue optimization service 118 returns an optimization profile for the customer according to the intersection point of the client supply curve 139 (FIG. 1) and the customer demand curve. The optimization profile may include, for example, the client identifier 148 (FIG. 1), the customer identifiers 157, the gender of the customers, the dates of birth of the customers, the customer values 166 or scores, an optimal discount percentage, a date, an information requested code, a status code, and/or other information. The record returned may be stored for logging and/or billing purposes. Thereafter, the portion of the revenue optimization service 118 ends.

Figure 6:
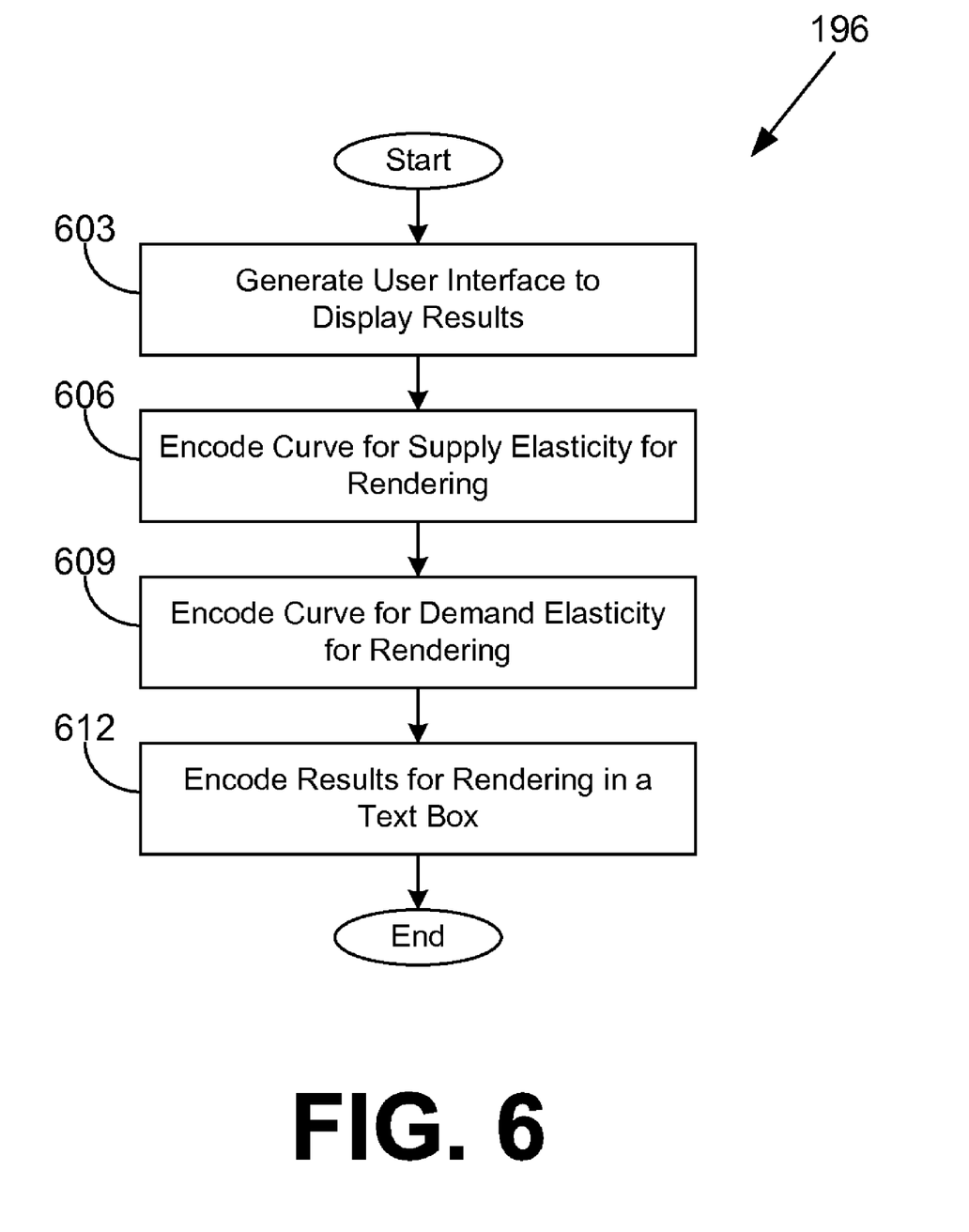
FIG. 6 is a flowchart illustrating one example of functionality implemented as portions of a client application executed in a client in the networked environment of FIG. 1 according to various embodiments of the present disclosure.

Moving on to FIG. 6, shown is a flowchart that provides one example of the operation of a portion of the client application 196 (FIG. 1) according to various embodiments. It is understood that the flowchart of FIG. 6 provides merely an example of the many different types of functional arrangements that may be employed to implement the operation of the portion of the client application 196 as described herein. As an alternative, the flowchart of FIG. 6 may be viewed as depicting an example of steps of a method implemented in the client computing device 109 (FIG. 1) or the computing device 103 (FIG. 1) according to one or more embodiments.

Beginning with box 603, the client application 196 generates a user interface to display the results of an optimization profile request. In box 606, the client application 196 encodes a curve for supply elasticity for rendering in the client computing device 109. The curve may correspond to the client supply curve 139 (FIG. 1). In box 609, the client application 196 encodes a curve for demand elasticity for rendering in the client computing device 109. The curve may correspond to the client demand curve 142 (FIG. 1) or a customer demand curve generated as described in connection with FIGS. 4A-4C and 5. In box 612, the client application 196 encodes the results of the optimization profile request for rendering in a text box. Thereafter, the client application 196 may render the text box and curves on the display 193 (FIG. 1). In one embodiment, the curves may be plotted similarly to the diagram 200 (FIG. 2). The portion of the client application 196 then ends.

Figure 7:
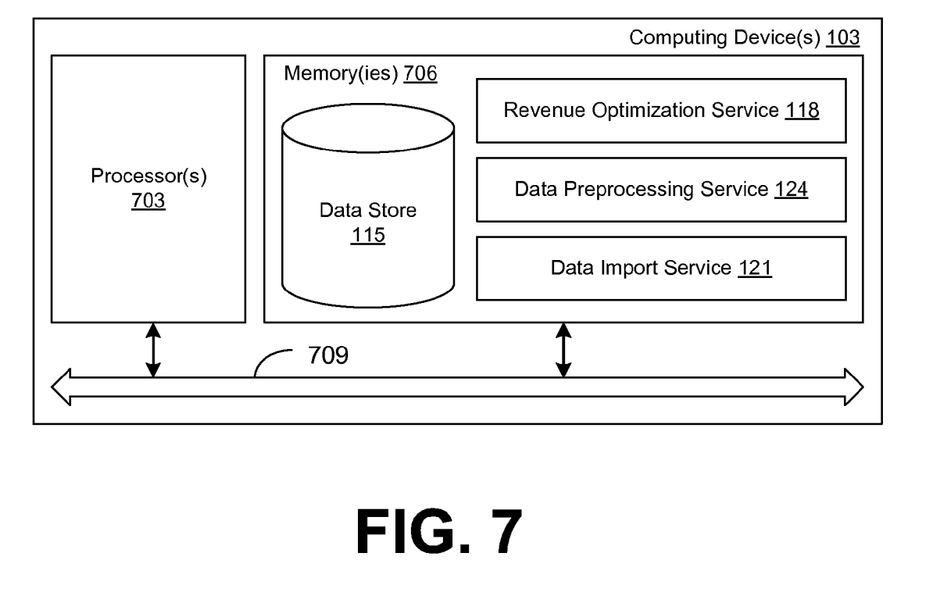
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the revenue optimization service 118, the data preprocessing service 124, the data import service 121, and potentially other applications. Also stored in the memory 706 may be a data store 115 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 112 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the revenue optimization service 118, the data preprocessing service 124, the data import service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-6 show the functionality and operation of an implementation of portions of the revenue optimization service 118, the data preprocessing service 124, and the client application 196 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the revenue optimization service 118, the data preprocessing service 124, the data import service 121, and the client application 196, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:
1. A system, comprising:
   at least one computing device; and a revenue optimization service executable in the at least one computing device, the revenue optimization service comprising:
  logic that obtains a plurality of transaction records associated with a customer and a merchant, each of the transaction records identifying a corresponding purchase of a quantity of one of a plurality of items by the customer from the merchant at a corresponding unit purchase price;
  logic that generates a normalized unit purchase price for each of the transaction records by normalizing the respective unit purchase price relative to a respective unit retail price at a time of the purchase; and
  logic that generates a demand curve for the customer for the items based at least in part on the transaction records and the normalized unit purchase prices, the demand curve identifying a quantity of units that the customer is predicted to purchase at a range of normalized unit purchase prices.

2. The system of claim 1, wherein the revenue optimization service further comprises logic that generates a supply curve for the merchant for the items, the supply curve identifying a quantity of units that the merchant is willing to sell at the range of normalized unit purchase prices.

3. The system of claim 2, wherein the revenue optimization service further comprises logic that determines a unit elasticity point from a point of intersection of the supply curve and the demand curve.

4. The system of claim 2, wherein the revenue optimization service further comprises logic that recommends a discount for one of the items to the merchant based at least in part on the supply curve and the demand curve.

5. The system of claim 1, wherein at least one of the transaction records reflects a unit purchase price that is discounted from the unit retail price.

6. The system of claim 1, wherein the revenue optimization service further comprises logic that selects the transaction records based at least in part on a time period during which the purchases were made.

7. The system of claim 1, wherein the revenue optimization service further comprises:
  logic that determines whether the transaction records meet a minimum threshold; and
  logic that augments the transaction records to include another plurality of transaction records associated with the customer and at least one other merchant within an industry segment that is the same as the merchant when the transaction records do not meet the minimum threshold.

8. The system of claim 7, wherein the transaction records meet the minimum threshold when a quantity of the transaction records meets the minimum threshold.

9. The system of claim 7, wherein the transaction records meet the minimum threshold when the transaction records relate to a quantity of unique items that meets the minimum threshold.

10. The system of claim 7, wherein the customer is associated with a first unique identifier to identify the customer in records of the merchant, and the customer is associated with a second unique identifier to identify the customer in records of the merchant and the different merchants.

11. The system of claim 1, wherein the revenue optimization service further comprises:
  logic that determines whether the transaction records meet a minimum threshold;
  logic that augments the transaction records to include another plurality of transaction records associated with the merchant and a plurality of different customers when the transaction records do not meet the minimum threshold; and
  wherein the different customers are determined based at least in part on at least one characteristic associated with the customer.

12. The system of claim 11, wherein the at least one characteristic is selected from the group consisting of: an age, a geographic area, and a gender.

13. The system of claim 1, wherein the items correspond to all items in a portfolio of items offered for sale by the merchant.

14. The system of claim 1, wherein each of the normalized unit purchase prices corresponds to a percentage of the respective unit retail price.

15. The system of claim 1, wherein a first one of the transaction records corresponds to a purchase of a quantity of a first item by the customer, a second one of the transaction records corresponds to a purchase of a quantity of a second item by the customer, and the first item and the second item are different items.

16. A method, comprising the steps of:
  obtaining, in at least one computing device, a selection of a subset of a plurality of customers of a merchant;
  obtaining, in the at least one computing device, a plurality of transaction records associated with the subset of the customers and the merchant, each of the transaction records identifying a corresponding purchase of a quantity of one of a plurality of items by one customer of the subset of the customers from the merchant at a corresponding unit purchase price;
  generating, in the at least one computing device, a normalized unit purchase price for each of the transaction records by normalizing the respective unit purchase price relative to a respective unit retail price at a time of the purchase; and
  generating, in the at least one computing device, a demand curve for the subset of the customers for the items based at least in part on the transaction records and the normalized unit purchase prices, the demand curve identifying a quantity of units that the subset of the customers are predicted to purchase at a range of normalized unit purchase prices.

17. The method of claim 16, further comprising the step of determining, in the at least one computing device, the selection of the subset of the customers based at least in part on a demographics parameter.

18. The method of claim 16, further comprising the step of determining, in the at least one computing device, the selection of the subset of the customers based at least in part on a customer value parameter.

19. The method of claim 16, further comprising the steps of:
  generating, in the at least one computing device, a supply curve for the merchant for the items, the supply curve identifying a quantity of units that the merchant is willing to sell at the range of normalized unit purchase prices; and
  determining, in the at least one computing device, a discount for at least one of the items based at least in part on an intersection of the supply curve and the demand curve.

20. A non-transitory computer-readable medium embodying at least one program executable in at least one computing device, the at least one program comprising:
  code that obtains a plurality of transaction records associated with a customer and a merchant, each of the transaction records identifying a corresponding purchase of a quantity of one of a plurality of items by the customer from the merchant at a corresponding unit purchase price;

code that generates a normalized unit purchase price for each of the transaction records by normalizing the respective unit purchase price relative to a respective unit retail price at a time of the purchase; and code that determines a discount for at least one of the items based at least in part on the transaction records, the normalized unit purchase prices, and a supply curve for the merchant for the items, the supply curve identifying a quantity of units that the merchant is willing to sell at a range of normalized unit purchase prices.

* * * * *